United States Patent
Crowther et al.

(10) Patent No.: US 8,225,772 B1
(45) Date of Patent: Jul. 24, 2012

(54) FUEL WARMING DEVICE

(76) Inventors: Russell C Crowther, New Market (CA); Charles R Crowther, East Montpelier, VT (US)

( * ) Notice: Subject to any disclaimer, the term of this patent is extended or adjusted under 35 U.S.C. 154(b) by 303 days.

(21) Appl. No.: 12/703,338

(22) Filed: Feb. 10, 2010

(51) Int. Cl.
*F02M 31/00* (2006.01)

(52) U.S. Cl. .......................... 123/553; 123/549; 123/557

(58) Field of Classification Search .................. 123/557, 123/549, 553
See application file for complete search history.

(56) References Cited

U.S. PATENT DOCUMENTS

| | | | |
|---|---|---|---|
| 3,989,019 A * | 11/1976 | Brandt et al. | 123/557 |
| 4,391,259 A * | 7/1983 | Urban | 123/557 |
| 4,519,341 A * | 5/1985 | McGarr | 123/1 A |
| 4,612,897 A | 9/1986 | Davis | |
| 4,700,047 A | 10/1987 | Crossett et al. | |
| 4,748,961 A * | 6/1988 | Headley et al. | 123/557 |
| 4,841,943 A * | 6/1989 | Favreau et al. | 123/557 |
| 4,858,584 A * | 8/1989 | Bridgeman | 123/557 |
| 4,865,005 A | 9/1989 | Griffith | |
| 4,984,555 A * | 1/1991 | Huang | 123/545 |
| 5,159,915 A | 11/1992 | Saito et al. | |
| D342,131 S | 12/1993 | Westenberg | |
| 5,378,358 A | 1/1995 | Park | |
| 5,443,053 A * | 8/1995 | Johnson | 123/557 |
| 5,809,980 A * | 9/1998 | Diduck | 123/549 |
| 5,908,021 A * | 6/1999 | Garcia | 123/549 |
| 6,179,577 B1 | 1/2001 | Meyer | |
| 6,743,355 B2 | 6/2004 | Roth et al. | |
| 6,845,732 B2 | 1/2005 | Lim | |

* cited by examiner

Primary Examiner — M. McMahon

(57) ABSTRACT

A fuel warming device for increasing the temperature of a vehicle's fuel from the fuel line before entering the engine featuring a housing, a copper coil spanning the housing, a heating fluid filling the housing, and a heating element for heating the heating fluid operatively connected to a power source via an electrical connection component. The fuel from the fuel line is heated in the copper coil tube by the heated heating fluid.

7 Claims, 5 Drawing Sheets

FUEL WARMING DEVICE

FIELD OF THE INVENTION

The present invention is directed to a device for warming fuel before it is combusted inside a vehicle engine.

BACKGROUND OF THE INVENTION

Numerous types of fuel warming systems for vehicles are currently in use. Fuel warming systems warm fuel before it is injected into the engine. The warming of fuel may help the efficiency of the combustion inside the engine. The present invention features an improved fuel warming device, which may be used, with unleaded fuel or diesel fuel.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

DESCRIPTION OF PREFERRED EMBODIMENTS

Figure 1:
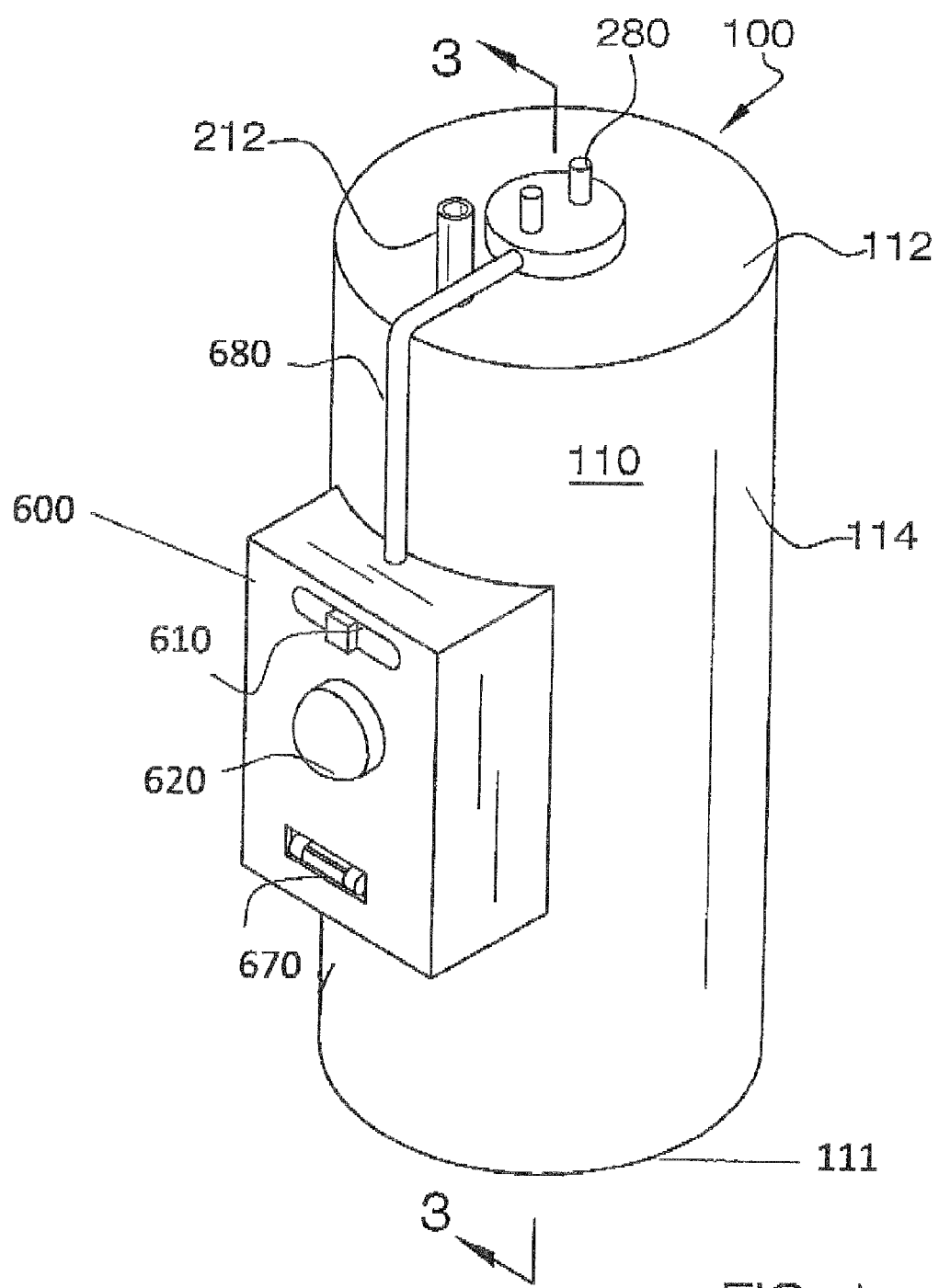
FIG. 1 is a perspective view of the fuel warming device of the present invention.
Figure 2:
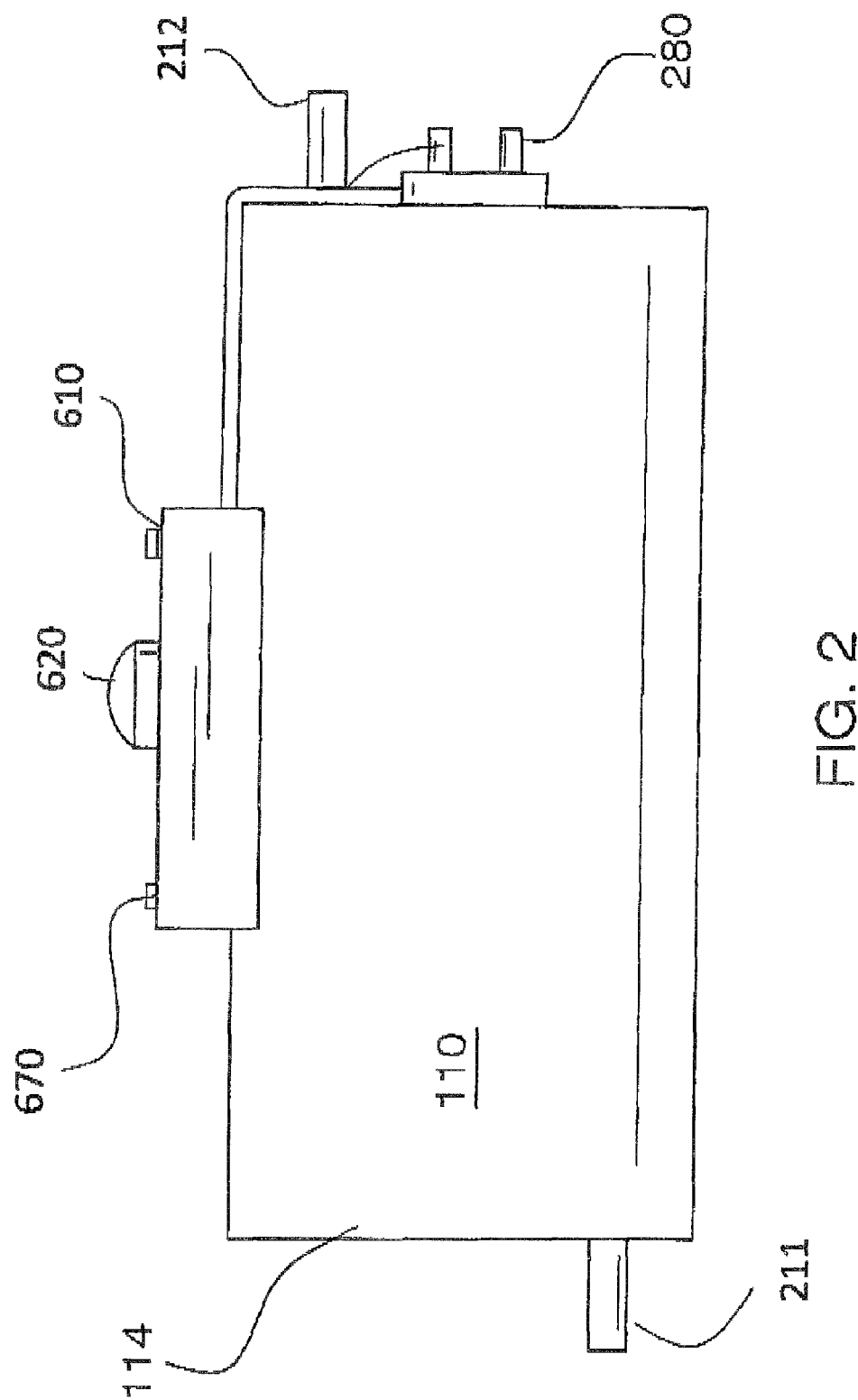
FIG. 2 is a side view of the fuel warming device of FIG. 1.

Referring now to FIGS. 1-5, the present invention features a fuel warming device 100 for increasing the temperature of fuel for an engine 430 of a vehicle 410 for improved combustion within the cylinders of the engine 430. The fuel warming device 100 can be used with diesel fuel or unleaded fuel.

The fuel warming device 100 comprises a generally cylindrical housing 110 (e.g., generally cylindrical housing) for heating the fuel. The housing 110 has a first end 111, a second end 112, an inner surface 113, and an outer surface 114, which altogether enclose an inner compartment 115. The housing 110 can be installed in a vehicle 410, for example near the engine 430 of the vehicle 410 (see FIG. 4). In some embodiments, the housing 110 is constructed from a material comprising a metal, e.g., copper, the like, or a combination thereof.

Figure 3:
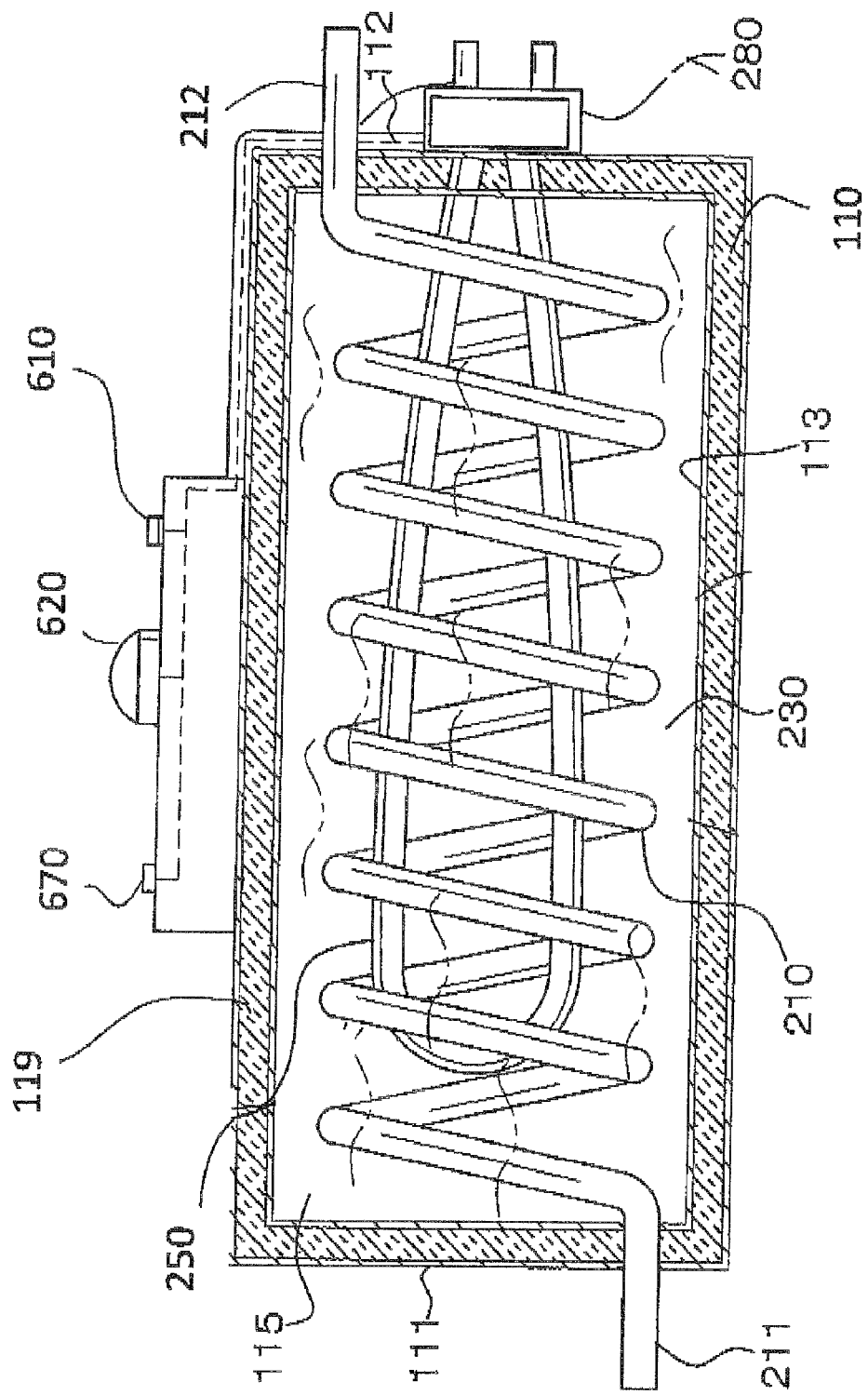
FIG. 3 is a side cross sectional view of the fuel warming device of FIG. 1.
Figure 4:
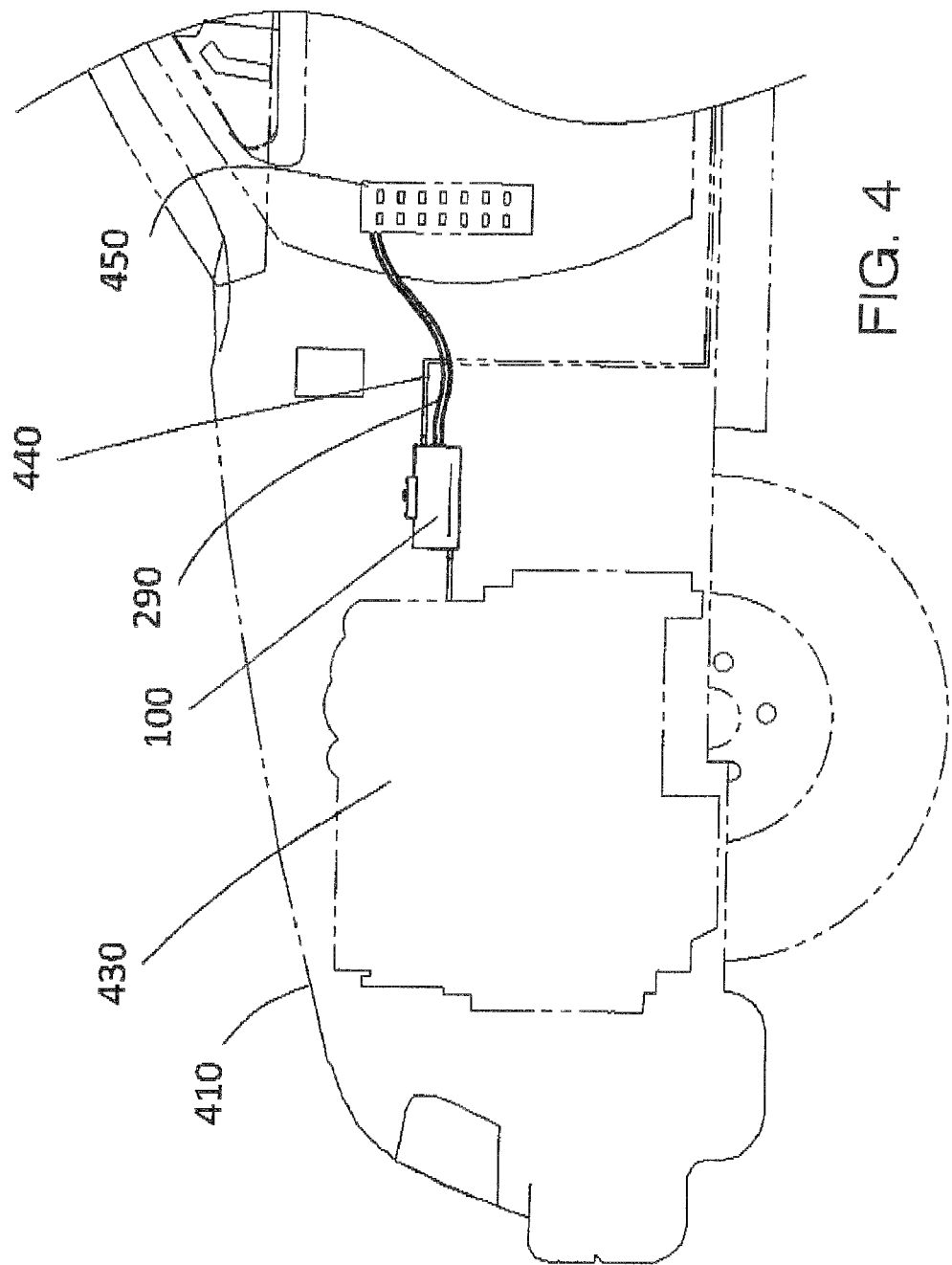
FIG. 4 is a side view of the fuel warming device of FIG. 1 as installed in a vehicle.
Figure 5:
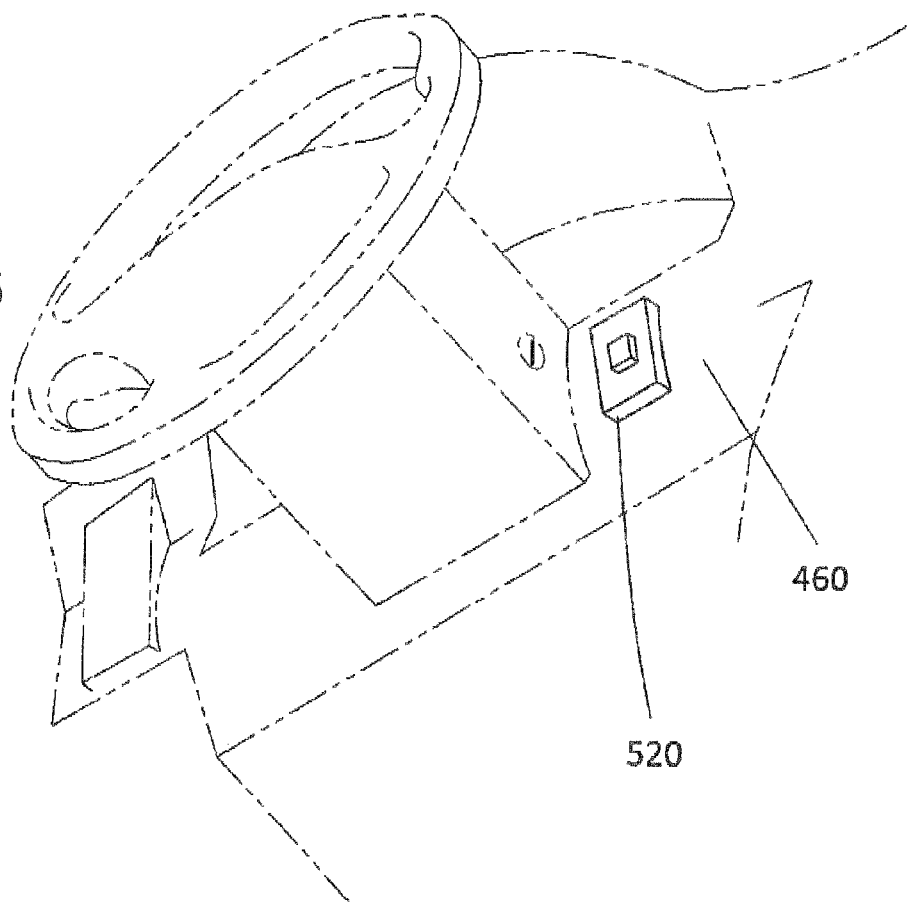
FIG. 5 is a perspective view of a control switch of the fuel warming device of the present invention as mounted on a dash of the vehicle.

Referring now to FIG. 3, a copper coil tube 210 having a first end 211 and a second end 212 spans the length of the housing 110 (e.g., as measured from the first end 111 to the second end 112) in the inner compartment 115 of the housing 110. The first end 211 of the copper coil tube 210 extends outwardly through the first end 111 of the housing 110 and the second end 212 of the copper coil tube 210 extends outwardly through the second end 112 of the housing 110. Fuel from a fuel line 440 can enter the copper coil tube 210 via the first end 211, and fuel can exit the copper coil tube 210 via the second end 212. Fuel exiting the copper coil tube 210 is subsequently injected into the engine 430 of the vehicle 410.

A heating fluid 230 is disposed in the inner compartment 115 of the housing 110. The heating fluid 230 fills the inner compartment 115 of the housing 110 and surrounds the copper coil tube 210. In some embodiments, the heating fluid 230 comprises a material such as an anti-freeze, a thermal transfer oil, the like, or a combination thereof. Such heating fluids are well known to one of ordinary skill in the art. The heating fluid 230 helps transfer heat quickly and evenly distributes the heat in the inner compartment 115 of the housing 110. The heating fluid 230 helps to held heat in the housing 110 (heat is held longer in the housing 110 with the heating fluid 230 than without the heating fluid 230).

A heating element 250 is disposed in the inner compartment 115 of the housing 110. The heating element 250 is for increasing the temperature of the heating fluid 230 that surrounds the copper coil tube 210. When the heating element 250 is activated, the temperature of the heating fluid 230 increases, which warms the copper coil tube 210. Fuel that runs through the copper coil tube 210 is then warmed by the copper coil tube 210, in some embodiments, the heating element 230 is a 12-volt submersible heater. In some embodiments, the heating element 250 is disposed in the center portion of the coil 210, in some embodiments, the heating element 250 is spread throughout portions of the inner compartment 115 of the housing 110.

The heating element 250 is operatively/electrically connected to an electrical connection component 280. In some embodiments, the electrical connection component 280 is disposed on the second end 112 of the housing 110. The electrical connection component 280 is for operatively connecting the heating element 250 to a power source, for example the battery or fuses 450 of the vehicle 410. In some embodiments, one or more electrical wires 290 connect the electrical connection component 280 to the battery or fuses 450 of the vehicle 410.

In some embodiments, the fuel warming device 100 of the present invention further comprises an electrical housing 600. In some embodiments, the electrical housing 600 is disposed on the outside surface 114 of the housing 110. In some embodiments, a power switch 610 is disposed on the electrical housing 600, which allow a user to turn the fuel warming device 100 on and off. For example, in some embodiments, the heating element 250 is operatively/electrically connected to the power switch 610 of the electrical housing 600. The power switch 610 can move between an on position (to turn on the heating element 250) and an off position (to turn off the heating element 250), for example.

In some embodiments, the fuel warming device 100 further comprises a power indicator light 620 for indicating when the fuel warming device 100 (e.g., heating element 250) is on. For example, the power indicator light may be operatively connected to the power switch 610. When the power switch is in the on position, the indicator light 620 may be illuminated. When the power switch is in the off position, the indicator light 620 may not be illuminated. Alternatively, the indicator lights may function via different colors or light patterns when the device is on or off.

In some embodiments, the electrical housing 600 comprises one or more precautionary fuses 670. Precautionary fuses are well known to one of ordinary skill in the art and are known to function to help prevent power overloads.

Referring now to FIG. 1, in some embodiments, a wire conduit 680 operatively connects the electrical connection component 280 to the electrical housing 600 (e.g., the indicator light 620, the power switch 610, and/or fuses 670).

In some embodiments, the fuel warming device 100 further comprises a thermal disc. In some embodiments, the thermal disc is similar to a thermostat, for example the thermal disc measures the temperature of the fuel and/or the heating fluid 230. The thermal disc may shut off the fuel warming device 100 (e.g., the heating element 250) off if a particular temperature has been reached. Or, in some embodiments, the thermal disc may turn on the fuel warming device 100 (e.g., the heating element 250) if the thermal disc detects that the fuel is too cold. In some embodiments, the thermal disc may help prevent the heating fluid 230 and/or fuel from overheating. The thermal disc may help to conserve energy, for example the device 100 is turned off automatically when it is not needed.

In some embodiments, the fuel warming device 100 further comprises a remote control switch device 520 for allowing a user to turn the fuel warming device 100 on and off from inside the vehicle 410. In some embodiments, the control switch device is installed inside the vehicle 410, for example on the dash 460 of the vehicle 410. In some embodiments, the fuel warming device 100 may be activated at any time by the user so that fuel is delivered to the engine 430 at a predetermined temperature. In some embodiments, the fuel warming device 100 can be hooked up to an ignition system of the vehicle for easy activation. The remote control switch device 520 may be operatively connected to the electrical connection component 280.

Without wishing to limit the present invention to any theory or mechanism, it is believed that the fuel warming device 100 of the present invention is advantageous because it will help to ensure optimum power and performance from the fuel being burned, thereby improving fuel economy for the vehicle 410. The fuel warming device 100 is designed such that the inner compartment 115 of the housing 110 is full of heating fluid 230 and constantly heats the coil 210 (when turned on). This design helps to keep the temperature of the heating fluid 230 and/or fuel constant, and helps prevent the device from freezing.

In some embodiments, the fuel warming device 100 is mounted within the engine compartment of the vehicle 410. In some embodiments, the fuel is warmed in about 6 to 7 minutes.

In some embodiments, the warming device 100 is installed in an aftermarket vehicle. In some embodiments, the warming device 100 is installed in a vehicle during production.

In some embodiments, the fuel warming device 100 further comprises insulation 119. The insulation 119 may be disposed, for example, between the outside surface 114 and the inside surface 113 of the housing 110 (see FIG. 3).

The fuel warming device 100 may be constructed in a variety of sizes. In some embodiments, the housing 110 is about 12 inches in length as measured from the first end 111 to the second end 112. In some embodiments, the housing 110 is between about 6 to 12 inches in length as measured from the first end 111 to the second end 112. In some embodiments, the housing 110 is between about 12 to 16 inches in length as measured from the first end 111 to the second end 112. In some embodiments, the housing is more than about 16 inches in length.

In some embodiments, the housing 110 is about 4 inches in diameter. In some embodiments, the housing 110 is between about 2 to 4 inches in diameter. In some embodiments, the housing 110 is between about 4 to 6 inches in diameter. In some embodiments, the housing 110 is more than about 6 inches in diameter.

In some embodiments, the electrical housing 600 comprises an optional pressure gauge for testing purposes, for example for testing when the fuel warming device 100 is being constructed.

As used herein, the term "about" refers to plus or minus 10% of the referenced number. For example, an embodiment wherein the housing 110 is about 5 inches in diameter includes a housing 110 that is between 4.5 and 5.5 inches in diameter.

The disclosures of the following U.S. patents are incorporated in their entirety by reference herein: U.S. Pat. No. 4,700,047; U.S. Pat. No. 5,159,915; U.S. Pat. No. 5,378,358; U.S. Pat. No. 6,845,739; U.S. Pat. No. 6,743,356; U.S. Pat. No. 6,179,577; U.S. Pat. No. 4,865,005; U.S. Pat. No. 4,612,897.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:

1. A fuel warming device for increasing a temperature of a fuel from a fuel line in a vehicle, said fuel warming device comprising:
    (a) a housing having a first end, a second end, an outside surface, an inner compartment, and an inside surface;
    (b) a copper coil tube spanning the housing, the copper coil tube having a first end that extends outwardly through the first end of the housing and a second end that extends outwardly through the second end of the housing; wherein the fuel enters into the first end of the copper coil tube and the fuel exits out through the second end of the copper coil tube;
    (c) a stagnant, non-circulating heating fluid filing the inner compartment of the housing, wherein the heating fluid surrounds the copper coil tube; and
    (d) a heating element disposed in the inner compartment of the housing, the heating element is for increasing a temperature of the heating fluid, wherein the heating element is operatively connected to a power source via an electrical connection component disposed on the housing;

wherein when the heating element is activated, the temperature of the fuel is increased as it passes through the copper coil tube.

2. The fuel warming device of claim 1, wherein the fuel warming device further comprises a electrical housing operatively connected to the electrical connection component, wherein the electrical housing comprises a control switch for turning on and off the fuel warming device.

3. The fuel warming device of claim 2, wherein an indicator light is operatively connected to the control switch, the indicator light functioning to visually indicate the fuel warming device is on or off.

4. The fuel warming device of claim 1, wherein the fuel warming device further comprises a electrical housing operatively connected to the electrical connection component, wherein the electrical housing comprises a precautionary fuse.

5. The fuel warming device of claim 1, wherein the heating element is positioned in a middle portion of the coil.

6. The fuel warming device of claim 1, wherein the fuel warming device further comprises a remote control switch for allowing a user to remotely turn the fuel warming device on and off from within the vehicle.

7. The fuel warming device of claim 6, herein the control switch is operatively connected to the electrical connection component.

* * * * *